US008290640B2

(12) United States Patent
Filliatre et al.

(10) Patent No.: US 8,290,640 B2
(45) Date of Patent: Oct. 16, 2012

(54) DEVICE FOR SERVOING GRAPHIC REPRESENTATIONS OF THE AIR ENVIRONMENT

(75) Inventors: Eric Filliatre, Merignac (FR); Philippe Neto, Eysines (FR)

(73) Assignee: Thales, Neuilly sur Seine (FR)

( * ) Notice: Subject to any disclaimer, the term of this patent is extended or adjusted under 35 U.S.C. 154(b) by 605 days.

(21) Appl. No.: 12/516,787

(22) PCT Filed: Nov. 27, 2007

(86) PCT No.: PCT/EP2007/062897
§ 371 (c)(1),
(2), (4) Date: Oct. 19, 2009

(87) PCT Pub. No.: WO2008/065119
PCT Pub. Date: Jun. 5, 2008

(65) Prior Publication Data
US 2010/0070113 A1    Mar. 18, 2010

(30) Foreign Application Priority Data
Nov. 28, 2006    (FR) .................................... 06 10398

(51) Int. Cl.
*G05D 1/00*    (2006.01)

(52) U.S. Cl. ......................................................... 701/4

(58) Field of Classification Search .................. None
See application file for complete search history.

(56) References Cited

U.S. PATENT DOCUMENTS

| | | | |
|---|---|---|---|
| 5,995,040 A * | 11/1999 | Issler et al. ..................... 342/352 |
| 6,828,922 B1 * | 12/2004 | Gremmert et al. ............ 340/949 |
| 2002/0113719 A1 | 8/2002 | Muller et al. |
| 2004/0217883 A1 | 11/2004 | Judge et al. |
| 2005/0007270 A1 | 1/2005 | Block |
| 2006/0025897 A1 * | 2/2006 | Shostak et al. ..................... 701/1 |
| 2006/0217853 A1 | 9/2006 | Servantie et al. |
| 2008/0243372 A1 * | 10/2008 | Bodin et al. ................. 701/206 |
| 2008/0252636 A1 | 10/2008 | Servantie et al. |
| 2009/0224945 A1 * | 9/2009 | Brehin et al. ................. 340/973 |

FOREIGN PATENT DOCUMENTS

WO    WO-98/04883 A    2/1998

* cited by examiner

*Primary Examiner* — Thomas Tarcza
*Assistant Examiner* — Nagi Murshed
(74) *Attorney, Agent, or Firm* — Stroock & Stroock & Lavan LLP (57) ABSTRACT

Device for servoing graphical representations of the aerial environment for aircraft, an avionics the device including a display, a computer and memory in communication with the computer, the memory storing means for generating images of environmental data, said data being servoed by the first calculation resource and periodically refreshed in a first time interval. The device comprises a calculation resource providing an angle of heading of the aircraft relative to North and its geo-referenced current position, these data being servoed, periodically, in real time in a second time interval. The representation of a part of the environmental data on the viewing screen of the device is servoed and refreshed during the second time interval and positioned and oriented graphically, by the display, according to the last current angle of the position of the aircraft calculated and of the last geo-referenced current position.

11 Claims, 8 Drawing Sheets

DEVICE FOR SERVOING GRAPHIC REPRESENTATIONS OF THE AIR ENVIRONMENT

CROSS-REFERENCE TO RELATED APPLICATION

This is a U.S. National Phase Application under 35 U.S.C. §371 of International Application no. PCT/EP2007/062897, filed Nov. 27, 2007, and claims benefit of French Patent Application No. 06 10398, filed Nov. 28, 2006, both of which are incorporated herein. The International Application was published in French on Jun. 5, 2008 as WO 2008/065119 under PCT Article 21 (2).

TECHNICAL FIELD

The present invention relates to devices for graphical representation of the aerial environment. It applies, more particularly, to graphical representation systems relating to situation perception, called "Situation awareness".

BACKGROUND OF THE INVENTION

Generally, the data, arising from these representations, are correlated with cartographic data. They can be of meteorological or topological type, for example. Within the framework of the device according to the invention, the graphical representations of the aerial environment are servoed according to a reference cycle of calculations of the avionics computer and overlaid on a mapping of the terrain.

Currently, equipment dedicated to graphical representations of the aircraft-related environment and of the aircraft-independent environment exists in aircraft such as civil and military airplanes or helicopters.

The systems for representing the aircraft-related environment depend on data specific to the aircraft, such as the system data, the trajectory, the altimetry data or the resources of said aircraft. The pilot is constantly informed of these data. These data are critical for navigation and are calculated and refreshed at each cycle of calculations of the avionics computer. They can, notably, serve for other applications which require information specific to the aircraft in the guise of input data to perform other calculations. These data may typically be the heading of the aircraft or its position in space, for example.

To enable the pilot to navigate with a knowledge of the environment so as to minimize the dangers, the data related to the environment of the aircraft are correlated with the environmental data independent of the aircraft. These data can be of the topological or meteorological type, for example. They can arise from a database, such as terrain data or be captured, calculated and processed in real time, such as meteorological data.

Correlation of these data makes it possible, for example, to ascertain and to predict, for a determined heading and a known trajectory, the potential dangers related to the situation of the aircraft in its outside environment. The prediction is evaluated in the near future with the assumption that the heading and the trajectory of the aircraft remain unchanged. Viewing screens or alarms are customarily used to alert the pilot.

One of the main benefits of such functions is to evaluate potential risks, notably, of collisions, of strong turbulence or else of lightning which would cause a decline in flight safety.

Several systems exist for representing the aircraft-related environment, which each depend on the data specific to a given application.

An exemplary existing system for analyzing environmental data is the WXR system, the trade name given to the product developed and marketed by Rockwell Collins, and standing for "Weather Radar System". This equipment is used in numerous aircraft. It includes a radar antenna, which permanently scans an angular sector situated in front of the carrier over a parametrizable distance. This equipment analyzes the atmosphere to recover meteorological data and provide them to the pilot.

On the basis of the data acquired in real time, the WXR equipment is capable of providing digitized meteorological information to the other systems of the carrier. This information then makes it possible, in the case of display systems situated in the flight cabin, to depict the sector scanned on a screen. The crew obtains the meteorological information in relation to the position of the carrier.

Moreover, another exemplary case of such systems is the TAWS system, the acronym standing for "Terrain Awareness Warning System". The system has been developed and marketed by Thales in collaboration with L-3 Communications, the name of the product is called T2CAS.

More generally, TAWS is a system which, with respect to altimetry data, arising from a numerical database, generates a graphical display and if appropriate audible alarms on the basis of a calculation which takes into account:
  the position of the carrier, as well as various flight parameters notably its speed and its heading;
  the extrapolations of the trajectory of the carrier in order to perform prediction calculations;
  the characteristics of the carrier in terms of performance, notably as regards the emergency climb phases at maximum performance.

On completion of this calculation, the TAWS advises the crew, graphically or in the form of audible alarms, of:
  the altitude slice in which the carrier is situated in relation to the terrain round about.
  the zones of the terrain which may over a short time scale endanger the safety of the flight if the crew does not modify the trajectory of the carrier
  the zones of the terrain which endanger the safety of the flight if the crew does not immediately modify the trajectory of the carrier The TAWS is a function which is embedded in real-time avionics computers.

Another exemplary application is the terrain topology cartographic representation system. This system, by means of a known numerical database, constructs a graphical representation of the terrain and its attributes, such as shade, vector data and obstacles.

In particular, in aircraft, the graphical representation of the terrain is servoed for a given calculation cycle by the carrier's current position and with respect to its heading. Several modes of representing the terrain and positioning of the carrier on the terrain are available depending on the operational contexts.

As regards the harmonization of the graphics, arising from the various applications, the structure of the data and the discretization of the information depend notably on each application and the protocols used. For example the TAWS and WXR applications structure their digital data according to radials. This data structure complies with the ARINC 453 protocol making it possible to provide, by means of generating images, formatted frames originating from calculation means.

Moreover, the cartographic function uses another mode of data structure.

Figure 1A:
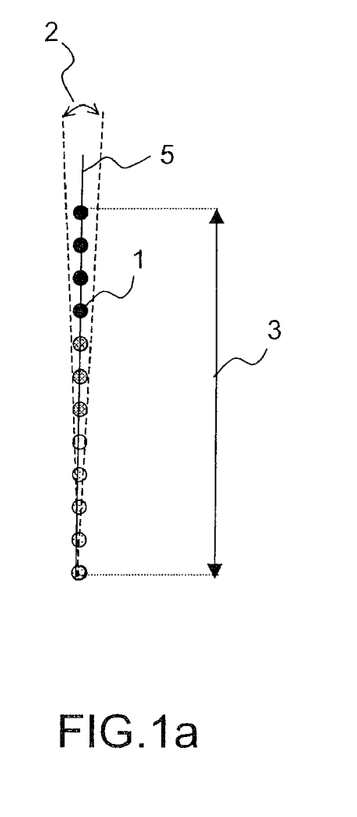
FIGS. 1a and 1b: The discretization of the data as radials.

Within this framework, FIG. 1a represents the digitization of information collected, in space or from a database, in the form of radials. A radial 5 is oriented along an angle close to the heading of the aircraft. In the TAWS application, the radial possesses a range 3 corresponding to the most distant point in the digitized zone. This radial includes a certain number of points 1. Each of the points digitizes an item of information, notably calculated on the basis of the altitude of the measured point. The point represents notably a danger for the aircraft in the near future if the heading does not change. The latter possesses a color code which indicates to the pilot the potential danger in the direction of the radial. The radials possess a spread, represented by an angle 2. At a given distance from the aircraft, the point discretizes the danger in a perimeter included in the angle 2 and between the point downstream and the point upstream of the point considered.

The actual representations of the data arising from the various applications use colors. The pilot can thus judge a zone dangerous or risk free as a function of the color code assigned.

Figure 1B:
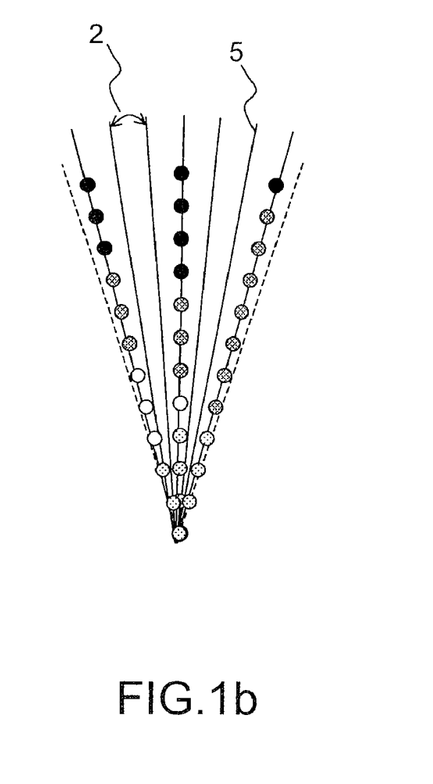

The TAWS application refreshes a set of radials in a determined calculation time and presents them to the pilot in graphical form. FIG. 1b represents a set of radials digitizing a part of the space situated in front of the aircraft.

For a cycle $C_0$ of the avionics computer, the resources being shared between the various applications, a certain number of radials can be calculated and displayed. In the example of the TAWS application, at each cycle $C_0$, four radials can be calculated and displayed. For example, an image, representing the TAWS data, is considered to be formed of 400 radials. A calculation cycle, denoted $C_1$, corresponding to 100 real-time cycles of the avionics computer, is necessary in order to consider that the image is entirely refreshed on the screen. On finishing the cycle $C_1$, the complete representation of the TAWS data is calculated and displayed, as a function of the heading and position of the aircraft. In the cycle $C_1$, the graphical representation of the TAWS data is redisplayed in parts at each cycle $C_0$, in the example in groups of four radials, on a viewing screen, to the pilot. This redisplay is carried out with the aircraft heading and position information corresponding to the first of the 100 cycles $C_0$ which make up a cycle $C_1$.

In the case of changes of heading of the aircraft, in particular when turning, there may be a de-synchronism between the orientation of the representation of the TAWS data and the actual heading newly calculated after a cycle $C_0$.

Figure 2:
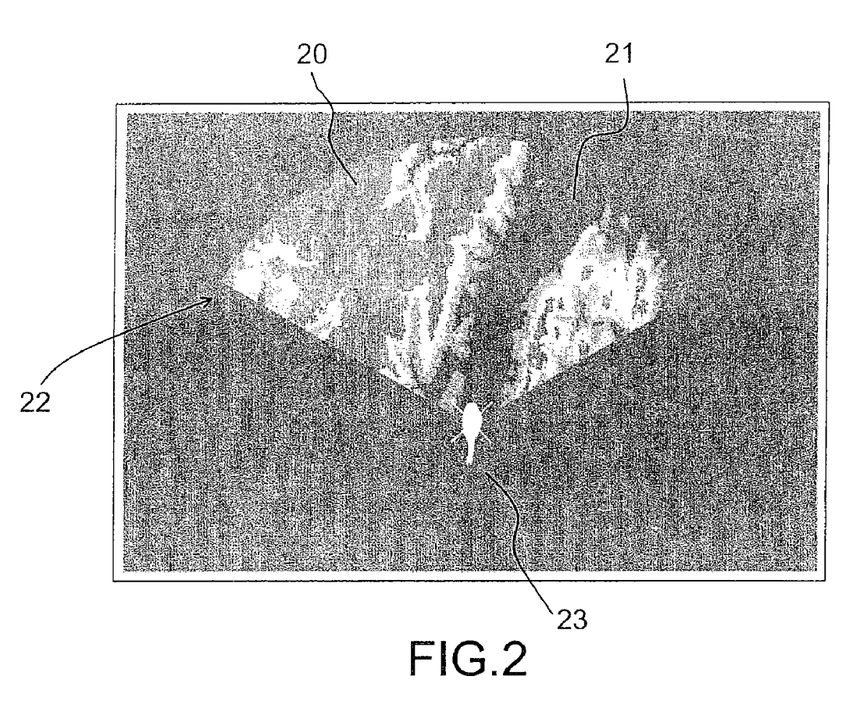
FIG. 2: The graphical representation of the data of a TAWS application.

FIG. 2 represents a graphic of an example of the TAWS application. It represents an angular sector 22 digitized by points of each radial. Each point represented includes a color information cue relating to danger, said danger being estimated on the basis of the aircraft's altitude extrapolated into the near future. This angular sector therefore includes zones of various hues or colors. This zone covers a wide angle centered on the heading of the aircraft 23. Certain hues 20 represent a danger if the aircraft steers towards this zone, other hues 21 signify that no danger of collision is visible in this direction.

During the cycle $C_2$, another application, such as the cartographic function, is capable of refreshing the whole of the geo-referenced map, on the basis of an embedded database, and to display the representation on a viewing screen.

In the example of the cartographic function application, cycle $C_2$ is equal to $C_0$. Thus the map is calculated and displayed, as a function of the heading and position of the aircraft, at each elementary cycle $C_0$.

Within a framework of another application, cycle $C_2$ could be greater than $C_0$.

Figure 3:
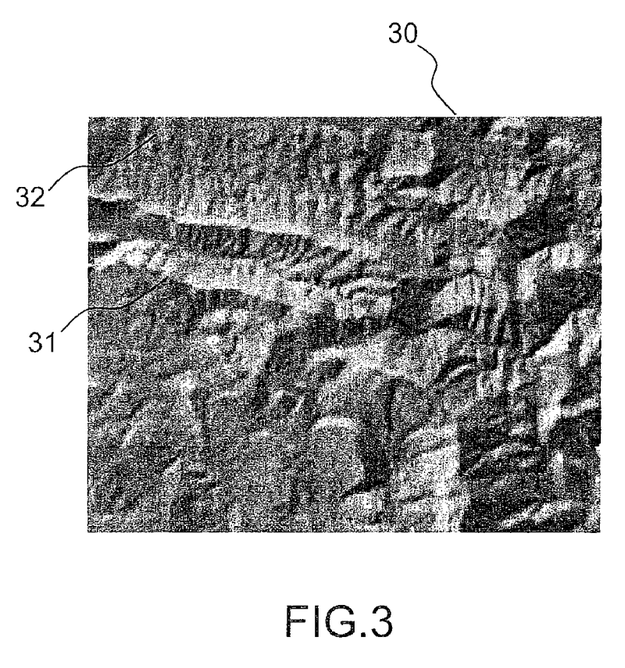
FIG. 3: The representation of the data of the mapping application.

FIG. 3 represents a mapping 30 of the relief that the aircraft is overflying. The zone 31 represents a relief which could be a mountain or a hill, the zone 32 represents a space of low relief.

The drawback, of the de-synchronism of operation of the various applications, is to provide the pilot with information originating from several applications in different data refresh time bases.

Currently, the cycles of calculations, notably of systems for the graphical representation of multiple environments which may or may not be related to the aircraft, are independent. Each application is dedicated to a given function and their integration requires as many graphical resources as there are applications.

The drawbacks of these solutions, such as developed, are their relative independence and their exclusive use which makes it necessary for example to integrate as many viewing screens as applications into the flight cabin. For example, each of the aforementioned three applications, the mapping application, the meteorological application, and the altimetry application, possesses dedicated graphical resources and a dedicated display.

The exclusivity of the applications requires the pilot either to manually change graphical representation on one and the same screen according to the application, or to track various screens during the piloting phase.

Another drawback is the refreshing of the data of each application which depends on the real-time constraints related to the calculational load of each application. The pilot is thus constrained, with full knowledge of the facts, to integrate this differentiation of data refreshing according to the application that he is consulting. If a reference calculation time cycle of the avionics computer is considered, each application servos its own data, calculationally or graphically, in accordance with its own specific number of cycles. The elementary cycle which represents the smallest real-time calculation cycle of the avionics computer allowing the calculation of the heading and position of the aircraft and the display of aircraft-related graphical data is defined in this patent, this cycle is denoted $C_0$ hereinafter.

An operating advantage for the pilot is of being afforded a common display of the various applications when the latter exhibit topological or geographical similarities. For example, the representation of the TAWS data and the representation of the cartographic function could be overlaid. This solution would offer the pilot visual comfort and greater help with decision making in the case of danger. The WXR meteorological application can also be overlaid on the cartographic function, as well as any other applications intended to represent graphical data on a display.

Nevertheless, within the framework of a common representation of the various graphical representations, it is necessary to harmonize and therefore to synchronize the refreshes and the graphical servoings for pilot readability as regards the information presented.

The device according to the invention lies within the framework of the integration of these various functions and the harmonization and synchronization of the refreshing of the graphical representations presented to the pilot independently of the structure and of the calculation of the applications data.

In order to harmonize the integration of the aforementioned applications or of other applications earmarked for graphical representation, it is necessary to consider a reference real-time calculation cycle $C_0$ of the avionics computer, such as defined previously, capable of providing at least the position of the aircraft and its heading to other resources. This cycle can be different depending on the avionics computers or the aircraft. It involves a calculation reference and does not constitute a restrictive datum of the device according to the invention.

Generally, the aircraft-related information, such as the system data, the trajectory, the altimetry data or the resources of said aircraft are all calculated in a cycle $C_2$. For certain applications, in the subsequent description, it is considered that the two cycles $C_0$ and $C_2$ are of equal value.

Such is the case for the mapping application, which in a cycle $C_0$, is capable of extracting the data from the digital terrain base, of generating an image and of orienting it as a function of the heading and position of the aircraft on a viewing screen.

Figure 4:
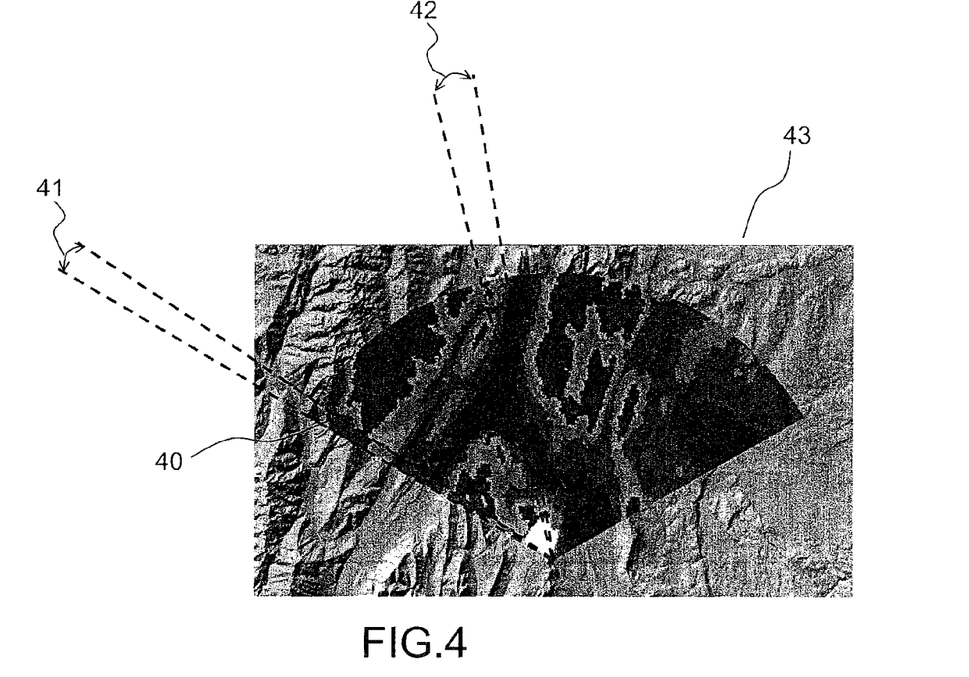
FIG. 4: The illustration of the shearing effect, of the graphical representation, related to the overlaying of data arising from two different applications.

FIG. 4 represents the example of a graphic 43 arising from the data of a TAWS application which is overlaid on a mapping of the space overflown.

The overlaying of the data of these two applications represents one case of realization among others. The structure of the data of these two applications does not restrict the range of the device of the invention.

The cartographic data arise from an application including a digital terrain database. The digital data of the TAWS application are refreshed graphically in groups of four radials in a circular manner, from left to right. At each cycle $C_0$, four additional radials are refreshed and displayed on a display. Each radial includes a number of given digitized points which are calculated. The set of radials making up an entire image is refreshed after a cycle $C_1$, corresponding to 100 cycles $C_0$.

The angular space 41 occupied by four radials represents a part of the graphical representation generated by the TAWS application.

The two graphical representations of each of the applications are redisplayed at the end of their own cycle, respectively $C_0$ and $C_1$.

When the aircraft changes heading for example, that is to say it performs a turn, the graphical overlay produces a shearing effect 40 with regard to the different servoing cycles. Only the part of the data included in the angular sector 41 is refreshed in the same time interval as the cartographic data. But the part of the data included in the angular sector 41 as well as the other part of the TAWS data are not reoriented according to the new heading and the new position of the aircraft, calculated in a cycle $C_0$, before the end of the cycle $C_1$. The pilot no longer obtains a representation of the TAWS data included in the angular part where they are not yet calculated, in accordance with reality during a short moment.

A certain number of cycles later, the data included in the angular space 42, including four radials, are themselves refreshed. The radial shearing occurs between the data refreshed on the left part of the drawing and those which will be refreshed in the forthcoming cycles in the right part of the drawing.

Despite the gain of information on one and the same screen, the shift of graphical overlay introduces discomfort for the pilot.

The refreshing by parts, and therefore over several cycles of calculations, of the TAWS data is independent of the mapping.

Figure 5:
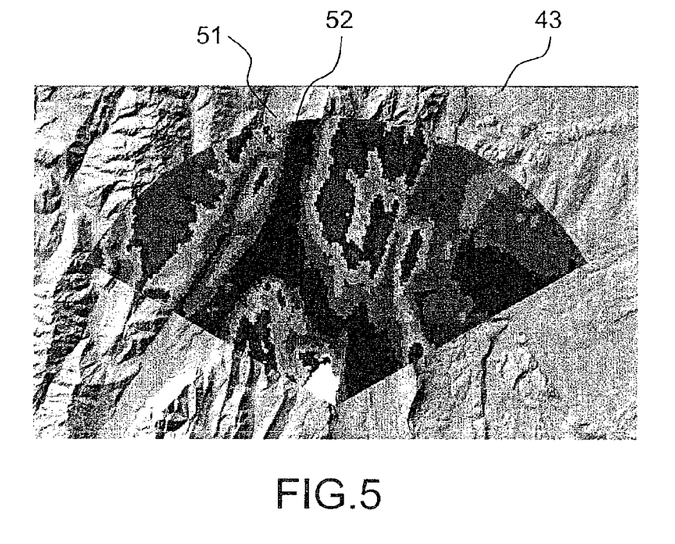
FIG. 5: The illustration of the effect of slippage of the graphical representation, related to the overlaying of data.

In the same manner, FIG. 5 represents one and the same overlay 43 of the data arising from the TAWS application and of the mapping application. A turn of the aircraft introduces a shift of the graphics. The zone 52 represents a danger-free zone, corresponding to a high altitude of the aircraft relative to the ground. This zone corresponds to the valley 51 of the mapping. It is markedly apparent that these two zones are not overlaid in this calculation cycle. A slippage originating from the change of heading of the aircraft is observed.

SUMMARY OF THE INVENTION

An aim of the invention is notably to alleviate the aforementioned drawbacks. For this purpose, the object of the invention is to harmonize the displays of the data arising from various applications.

Advantageously, the device for servoing graphical representations of the aerial environment for aircraft, also called situation awareness, includes viewing means, an avionics computer, and
on the one hand;
a first resource for processing and storing data, said data being called environmental data;
first means for generating images of the environmental data, said data being servoed by the first calculation resource and refreshed, periodically, in, at least, a first time interval t1 and;
on the other hand;
a second calculation resource providing an angle of heading of the aircraft relative to North and its geo-referenced current position, these data being servoed, periodically, in real time in a second time interval t2, such that the second time interval t2 is less than the first time interval t1.

Advantageously, the representation of a part of the environmental data on the viewing screen of the device is servoed and refreshed in the second time interval t2 and positioned and oriented graphically, by the viewing means, according to the last current angle of the position of the aircraft calculated and of the last geo-referenced current position.

Advantageously, the device includes a set of numerical databases representing topological terrain information, called cartographic data, these data being servoed by the computer to second means for generating images and refreshed, oriented and positioned on the viewing screen in the second time interval t2 according to the heading and position of the aircraft, in such a manner that the environmental data are overlaid on the cartographic data.

Advantageously, the part of the environmental data displayed on the viewing screen is represented symmetrically on either side of the heading of the aircraft and its origin is the current position of the aircraft.

Advantageously, the environmental data calculated cover a first geographical zone and the environmental data displayed cover a second geographical zone included in the first zone, the area of the second zone being sufficiently small so that during the first time interval t1, with regard to the maximum performance of displacements of the aircraft, the second zone always remains included in the first zone.

Advantageously, the environmental data are meteorological data, such as the data originating from the WXR system, known as a "Weather Radar System".

Advantageously, the environmental data are altimetry data, such as the data originating from the TAWS system, known as a "Terrain Awareness Warning System".

Advantageously, the environmental data digitize a symmetric angular sector $\theta_0$ on either side of the heading of the aircraft, said angular sector having a constant range L and origin point defined by the current position of the aircraft.

Advantageously, the angular sector is composed of a number of radials Nr, each having a range L, a spread $\theta_1$, with center the current position of the aircraft, the spacing between two radials being defined by the angle $\theta_1/2$.

Advantageously, the radials are calculated by the computer, successively in groups of four, in the second time interval t2, the set of radials, forming the angular sector, being calculated in the first time interval t1.

Advantageously, the environmental data are transmitted according to the ARINC 453 protocol, to the image generating means.

Advantageously, the first time interval t1 is equal to 2.5 s and the second time interval t2 is equal to 25 ms.

BRIEF DESCRIPTION OF THE DRAWINGS

Other characteristics and advantages of one or more embodiments of the invention will become apparent with the aid of the description which follows given in conjunction with the appended drawings which represent.

DETAILED DESCRIPTION OF THE INVENTION

The device according to the invention introduces a concept of consistency of graphical refreshing over a cycle $C_0$ for the whole of the data arising from an application, such as TAWS.

Independent of the data of the cartographic application, there is a harmonization of the graphical refreshing of the data of the TAWS application during a cycle $C_0$ as a function of the heading and position of the aircraft.

Thus, the device according to the invention affords the pilot a display oriented according to the heading and position of the aircraft at each cycle $C_0$ independently of the calculation cycle for the data themselves.

Figure 6:
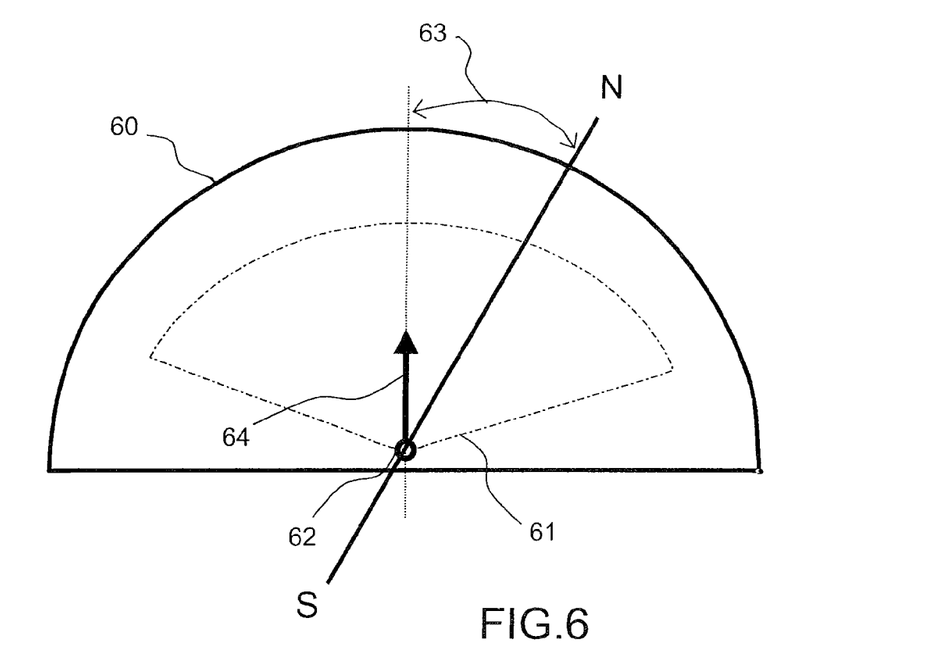
FIG. 6: The principle of the extraction of the data servoed graphically in the TAWS application by the heading and the position of the aircraft.

FIG. 6 illustrates a simple means for servoing the representation of the graphical data of the TAWS as a function of the current position of the aircraft and of its heading in a cycle $C_0$. This servoing of the representation of the graphical data of the TAWS application is independent of the servoing of the calculation of the data of this same application.

A space 60 is considered, corresponding to the set of TAWS data which are calculated in a cycle $C_1$ equivalent to 100 cycles $C_0$. These data can potentially be represented graphically in the form of radials but in this example constitute only a representation of the data calculated and not displayed. A subset 11 of these data which will actually be displayed to the pilot on a display is considered. The heading of the aircraft 64 is represented by a vector. This heading is geo-referenced with respect to the North-South axis by an angle 63.

The device according to one or more embodiments of the invention makes it possible, during a cycle $C_0$, on the one hand:
- to refresh on the screen the set of calculated data corresponding to the space 61, sampled symmetrically with respect to the last calculated heading of the aircraft;
- to display them, the following cycle, symmetrically on either side of the new calculated heading and having the new position of the aircraft as origin.

Figure 7:
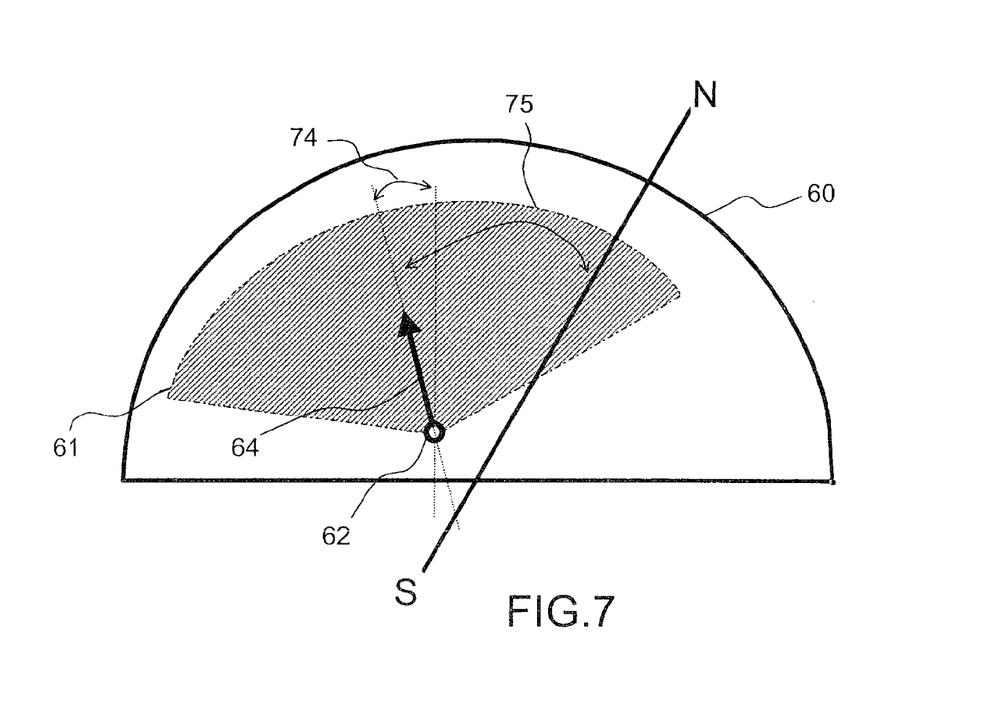
FIG. 7: The servoing of a graphic by the position and the heading of the aircraft.

FIG. 7 represents the new heading 64 and the new position 62 of the aircraft, calculated the following cycle and the data 61 which are displayed the following cycle. The new heading makes an angle 74 with the heading calculated the previous cycle.

The pilot views the representation of the TAWS data centered around the heading 64, the heading of the aircraft always being represented to him vertically, directed upwards.

The device according to one or more embodiments of the invention makes it possible by way of the graphical resources of the TAWS application, to perform a rotation and a translation of the data sampled at each cycle $C_0$.

The rotation is determined by the angle formed by the last two calculated headings of the aircraft. The translation is obtained by comparing the last two positions, each geo-referenced, of the aircraft.

Figure 8:
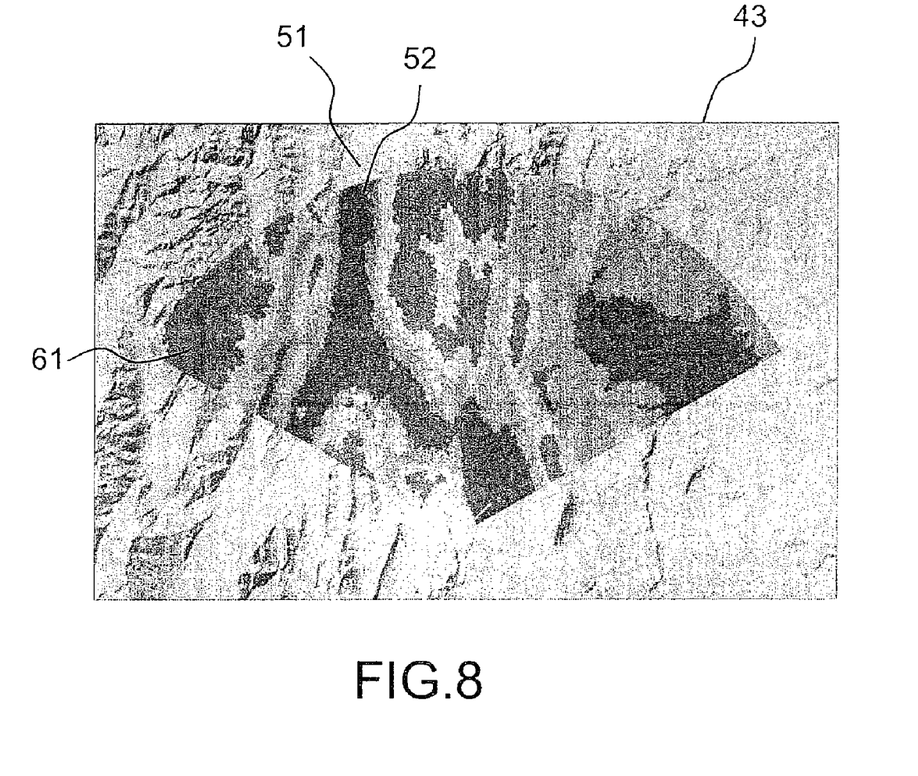
FIG. 8: The elimination of the effect of slippage between the cartographic data and TAWS data.

The representation of FIG. 8 is obtained after the calculation of the translation and rotation by embedded calculation means, in a cycle $C_0$. In this figure, the cartographic data, calculated and displayed in a cycle $C_0$, are represented, as are the data 61 arising from the TAWS application. It is noted that the zones 51 and 52 are overlaid.

It is preferable to consider a subset 61 necessarily smaller than the set of the data 60 arising from the TAWS application. The margin between the two sets of data 60 and 61 represents a sufficiently large latitude of the displacement of the aircraft such that the data to be extracted is always available to the TAWS application, over a cycle $C_1$, so that said data are represented on the display.

The extreme case is that, for example, of a turn performed in a sufficiently short time by the aircraft, in such a way that before the end of the cycle $C_1$, the latter including 100 cycles $C_0$, the subset 61 leaves the space of the known data 60. The data 60 are calculated in their entirety in a cycle $C_1$.

Figure 9:
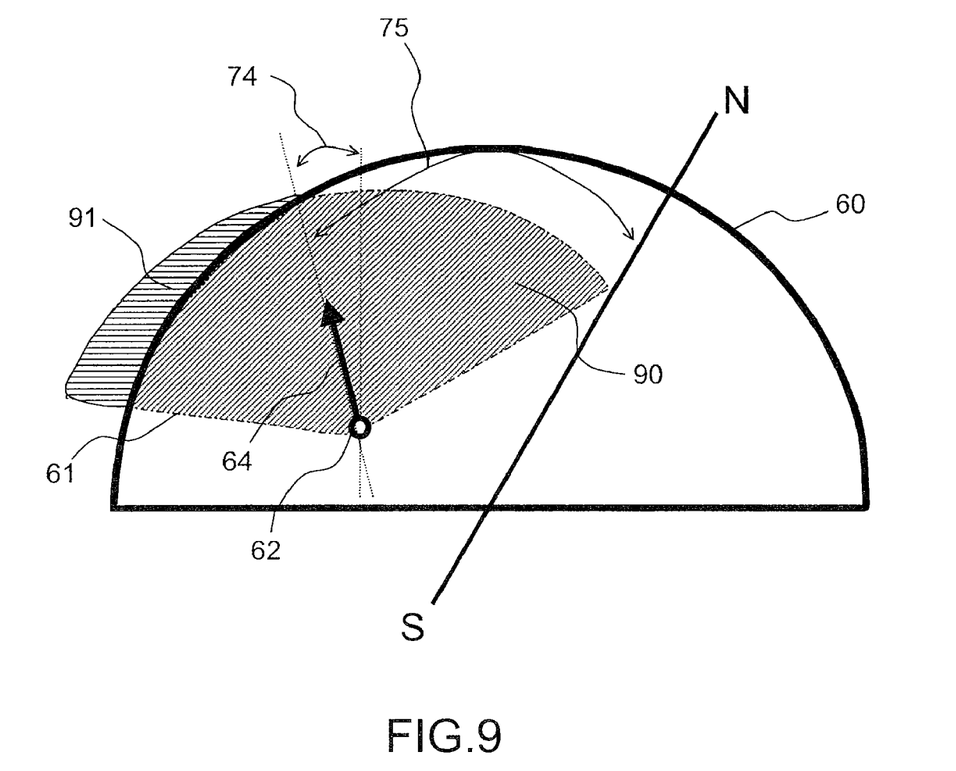
FIG. 9: An example of an unsuitable graphical servoing.

FIG. 9 represents a critical case where the aircraft would have performed a sufficiently significant change of heading such that the set of data 61 extracted so as to be refreshed on the display is not complete. The space 91 cannot be represented on the display since the corresponding data do not exist. The 100 cycles required to calculate the new data following the new heading and the new position of the aircraft has not been reached. Only the subset of data 90 is available to the graphical resources.

This representation, illustrated in FIG. 9, would give rise to visual discomfort for the pilot as regards the geometric representation of the data presented to him. It therefore should not be allowed. The margin between the set of data 60, calculated over 100 cycles $C_0$, and the subset of data displayed 61, at each cycle $C_0$, should be sufficient. This margin is calculated so that no realistic change of heading of the aircraft allows the graphical resources to display a data set including an empty subset.

Figure 10:
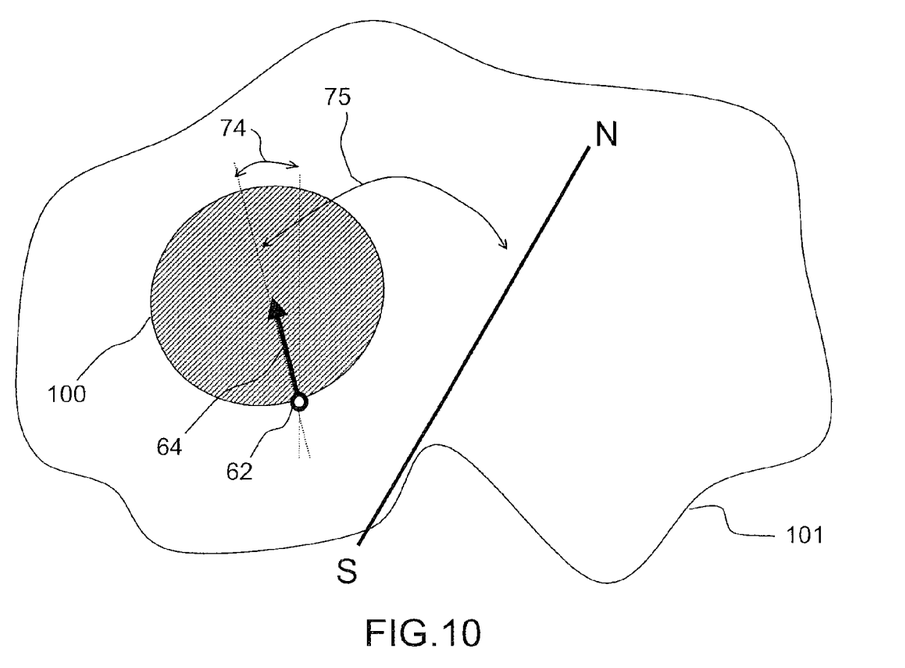
FIGS. 10 and 11: An example of extracting data according to a particular geometric shape.
Figure 11:
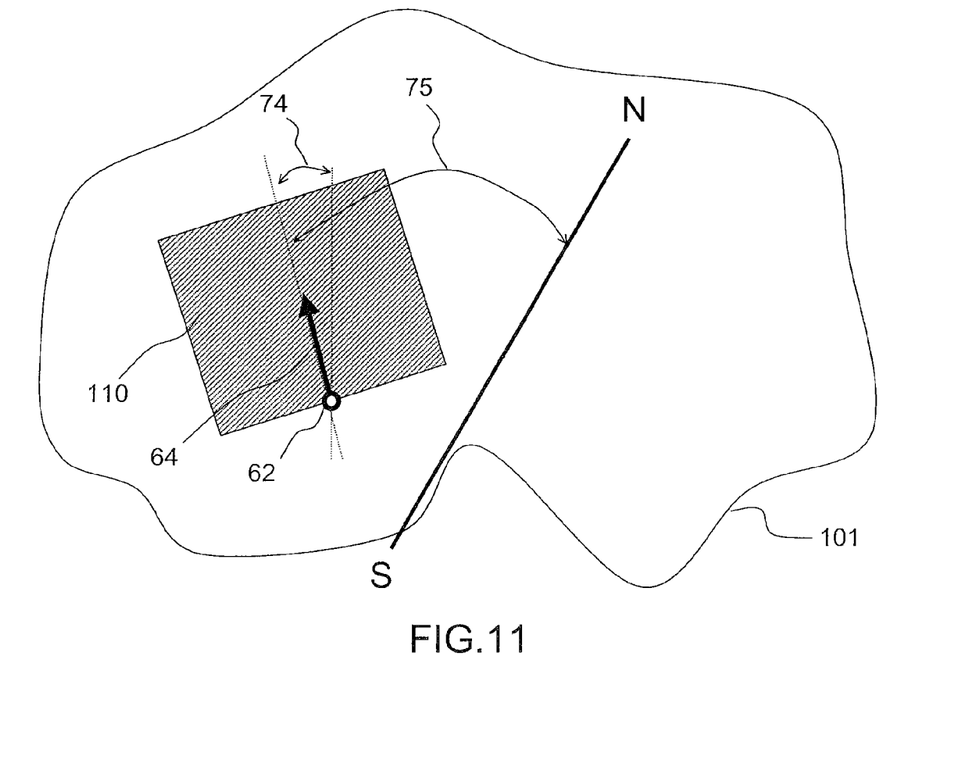

In other cases of realizations, FIGS. 10 and 11 represent a device according to one or more embodiments of the invention, including a set of data 101 calculated in a cycle $C_1$ which is not specifically organized as radials. The device operation includes servoing a subset of data 100 or 110 of the set 101, as a function of the heading and position of the aircraft so as to orient them at each cycle $C_0$ on a viewing screen of the aircraft. This subset advantageously possesses a notable geometric shape, such as a circle, rhombus, triangle or rectangle, so that the calculations are less complex.

Equally, in another case of realization, the application concerned can share its graphical resources with another application or with the main graphical resource of the avionics computer.

The invention claimed is:

1. A device for presenting graphical representations of an aerial environment for an aircraft, said device comprising:
   a processor;
   a first display screen in communication with the processor;
   a memory in communication with the processor, the memory adapted to store:
      a series of instructions executable by the processor to periodically generate and store environmental data in a first time interval;
      a series of instructions executable by the processor to calculate a heading of the aircraft relative to North and a geo-referenced current position of the aircraft, wherein the heading and the geo-referenced current position are periodically generated during a second time interval that is less than the first time interval; and
      a series of instructions executable by the processor to generate an image of a predetermined subset of the environmental data that is periodically refreshed and displayed on the first display interval;
   wherein the image of the predetermined subset of the environmental data periodically displayed on the first display screen is positioned and oriented graphically on the first display screen according to a last calculated heading and a last calculated geo-referenced position.

2. The device as claimed in claim 1, wherein the memory is further adapted to store cartographic data, the cartographic data being transmitted by the processor to a second display screen in communication with the processor, the cartographic data being refreshed, oriented and positioned on the second display screen during the second time interval according to the heading and the geo-referenced position of the aircraft, wherein the image of the predetermined subset of the environmental data is overlaid on the cartographic data.

3. The device as claimed in claim 1, wherein the predetermined subset of the environmental data is symmetric with respect to either side of the heading of the aircraft, wherein an origin of the predetermined subset of the environmental data is a geo-referenced current position of the aircraft.

4. The device as claimed in claim 3, wherein the predetermined subset of the environmental data comprises a first geographical zone and a second geographical zone, the second geographical zone included in the first geographical zone, and the area of the second geographical zone always remains included in the first geographical zone during the first time interval.

5. The device as claimed in claim 1, wherein the environmental data comprises meteorological data.

6. The device as claimed in claim 1, wherein the environmental data comprises altimetry data.

7. The device as claimed in claim 1, wherein the environmental data comprises digitized data from a symmetric angular sector on either side of the heading of the aircraft, said symmetric angular sector having a substantially constant range and having an origin point substantially coincident with the current position of the aircraft.

8. The device as claimed in claim 7, wherein the angular sector comprises a plurality of radials, each radial having a range and a spread, each of the radials originating at the current position of the aircraft, the spacing between two adjacent radials given by an angle substantially equal to half the spread.

9. The device as claimed in claim 8, wherein the radials are calculated by the processor, successively in groups of four, during the second time interval, with the plurality of radials forming the angular sector, and the angular sector is calculated during the first time interval.

10. The device as claimed in claim 1, wherein the environmental data are transmitted to the first display by use of an ARINC 453 protocol.

11. The device as claimed in claim 9, wherein the first time interval is substantially equal to 2.5 s and the second time interval is substantially equal to 25 ms.

* * * * *